United States Patent [19]
Sheinbein

[11] 4,277,649
[45] Jul. 7, 1981

[54] METHOD AND APPARATUS FOR SCREENING TELEPHONE CALLS

[75] Inventor: Daniel Sheinbein, Elizabeth, N.J.

[73] Assignee: Bell Telephone Laboratories, Incorporated, Murray Hill, N.J.

[21] Appl. No.: 113,384

[22] Filed: Jan. 18, 1980

[51] Int. Cl.³ .............................................. H04M 3/42
[52] U.S. Cl. ............................ 179/18 B; 179/7 MM; 179/18 BE; 179/18 D; 179/18FH
[58] Field of Search .......... 179/18 B, 18 BE, 18 BG, 179/18 BH, 18 BA, 18 DA, 7 MM, 18 D, 18 FH

[56] References Cited

U.S. PATENT DOCUMENTS

| | | | |
|---|---|---|---|
| 3,189,687 | 6/1965 | Miller | 179/18 DA |
| 3,689,703 | 9/1972 | Allen et al. | 179/18 B |
| 3,691,301 | 9/1972 | Zarouni | 179/18 B X |
| 3,881,060 | 4/1975 | Connell | 179/5.5 |
| 4,166,929 | 9/1979 | Sheinbein | 179/18 BG |

FOREIGN PATENT DOCUMENTS 1162484 8/1969 United Kingdom ............... 179/18 DA

OTHER PUBLICATIONS

"Common Channel Interoffice Signaling: An Overview", Ritchie et al., *Bell System Technical Journal*, vol. 57, No. 2, Feb. 1978, pp. 221-224.

*Primary Examiner*—Thomas W. Brown
*Attorney, Agent, or Firm*—Charles H. Davis

[57] ABSTRACT

A telephone system is disclosed for providing customized telephone services. A called customer can screen calls incoming to his station based on the identity of the calling line. The calling line's identity is forwarded to the switching office containing the called customer's screening memory. The memory is interrogated to ascertain the call disposition based on information priorly put in the memory by the called customer. Selective call waiting, selective call forwarding, priority ringing, and many other customized services are contemplated.

15 Claims, 9 Drawing Figures

DIRECTORY NUMBER TRANSLATION TABLE

| OFFICE CODE | DIRECTORY NUMBER | CALL FWDG | LINE EQUIPMENT NO. | CUSTOMIZED SERVICES |
|---|---|---|---|---|
| 555 | 1234 | | XXXXXX | XXXX |
| ≈ | | | | ≈ |

| PERMITTED SERVICES 201-555-1234 | CALL WAITING | PRI RING | AUTO COLL. | CALLING LINE ID | SPL-1 |
|---|---|---|---|---|---|
| | CALL FWDG | ANS & REC | CALL DIST | CALLING LINE REC | CALL ACCEPT |
| AREA CODE OFFICE CODE | | | | | |
| LINE NUMBER | | | | | |

METHOD AND APPARATUS FOR SCREENING TELEPHONE CALLS

TECHNICAL FIELD

This invention relates to communication systems, and particularly, to the provision of special screening services in a telephone system.

In a more particular aspect, this invention relates to special services wherein a called telephone customer can designate the treatment of incoming calls from preselected calling customers.

BACKGROUND ART

While the telephone system as a means of communication has grown from an instrument of convenience to one of necessity, there are still occasions when telephone calls may offer some inconvenience to the customers using the system.

For example, most calls are originated at the complete discretion of the calling customer who not only chooses the called customer but selects the time and place from which the call originates.

Although the call is placed at the convenience of the call originator, the called customer may not wish to be disturbed at this time and, indeed, may be at some other location.

Arrangements are available for blocking calls or routing calls to an answering service so as not to disturb the called customer. Furthermore, there are arrangements for forwarding incoming calls to another location where the called party can be reached or where an associate at that location can accept the call.

While these arrangements are wholly suitable for their intended purpose, they generally treat all incoming calls in the same manner. Thus, if the called customer elects not to be disturbed, all calls will be blocked unless they are routed via an attendant or secretary who can exercise discretion by allowing only selected important calls to reach the called customer.

Insofar as billing in a telephone system is concerned, most calls are billed to the calling customer. Although some calls can be billed to the called customer or to a third party, these calls require the service of an attendant to ascertain whether the party to be billed will accept the charges. Of course, the call may be delayed while the attendant verifies if the charges will be accepted.

Accordingly, with the above described and other special services there is no selective processing of calls under the control of the called customer without the intervention of an attendant.

DISCLOSURE OF THE INVENTION

The foregoing problem is solved and a technical advance is achieved by a method for automatically screening calls to a called station wherein the nature of the screening is designated and controlled by the called station.

More specifically, the called station having the screening service is provided with a memory which can be suitably located at a destination switching center which serves the station. The customer accesses the memory and enters in the memory the identity of all calling lines whose calls are to be screened. In addition, an indication is entered in the memory of the treatment to be given to calls incoming from these lines.

When an incoming call arrives at the switching office containing the called station's memory, the control equipment ascertains if the called customer is provided with the special screening service feature. If this service feature is provided, a signal is sent to the originating switching office requesting the identity of the calling line. Using the calling line identity, the memory at the destination office is read to ascertain if the calling line is to be given the special treatment requested by the called party. The control equipment then disposes of the call according to the special treatment indication found in the memory location assigned to the calling line identity or sends a message to the originating office as to the disposition of the call. Among the special service treatments given calls from certain calling lines include selective call blocking, selective call waiting, selective call forwarding, distinctive ringing, special billing and many others.

DETAILED DESCRIPTION

Figure 1:
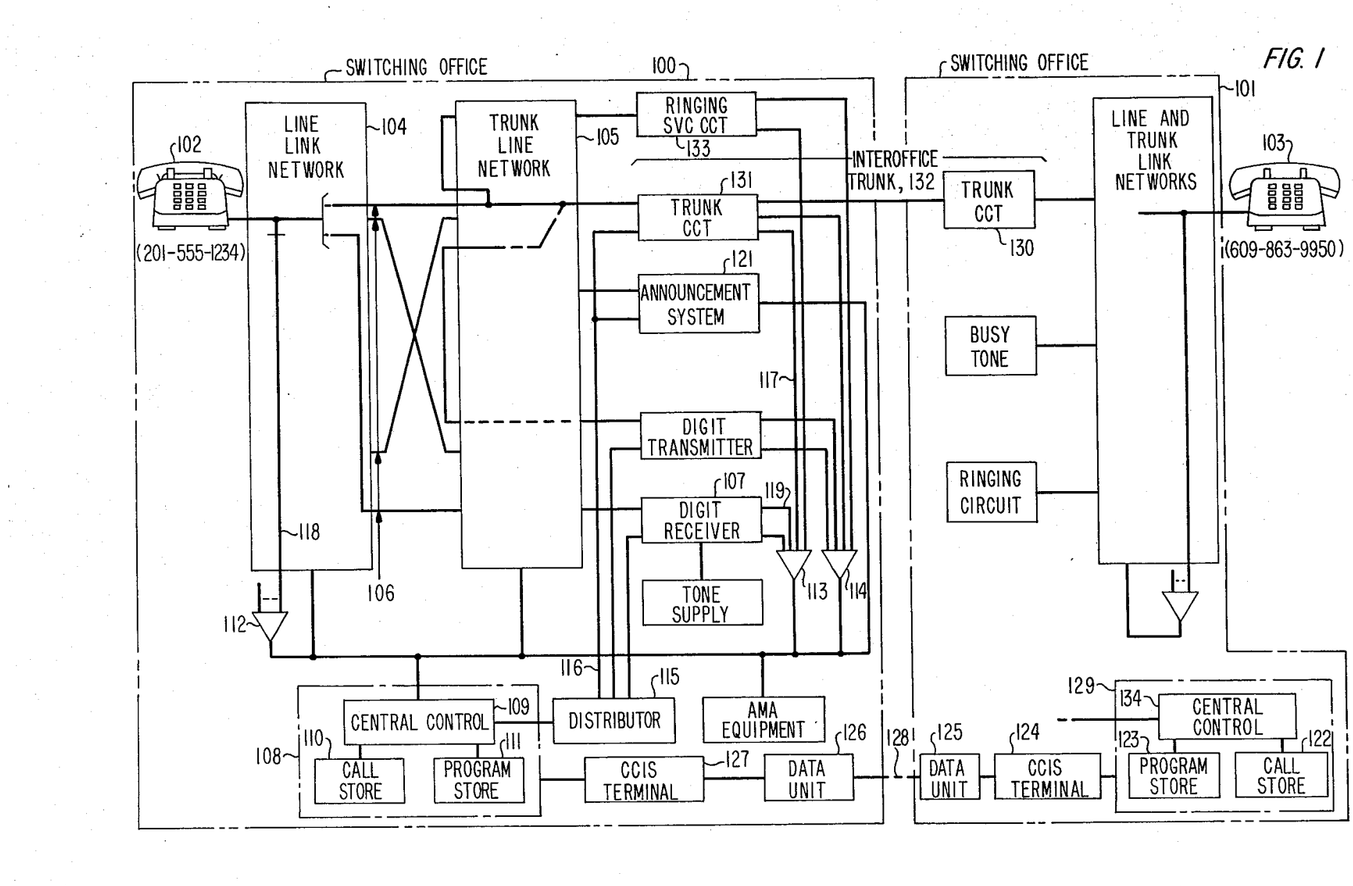
FIG. 1 shows, in block diagram form, a typical telephone system having two stored program controlled switching offices interconnected by trunks and a common channel interoffice signaling system.

FIG. 1 shows a block diagram of a typical switching network comprising switching offices 100 and 101, each of which serves a plurality of customer stations such as 102 and 103.

By way of example, each of the switching offices is suitably an electronic program controlled switching office of the type disclosed in U.S. Pat. No. 3,570,008 to R. W. Downing et al of Mar. 9, 1971, and also disclosed in the *Bell System Technical Journal*, Vol. XLIII, No. 5, Parts 1 and 2, September, 1964. These citations may be referred to for a more comprehensive understanding of the construction and operation of the switching system, but a brief description will be given herein to illustrate how the invention functions within the switching system.

Switching office 100 comprises line link network 104, trunk link network 105, and a stored program controlled processor 108. Line link network 104 provides the terminations for customer stations, such as 102, while trunk link network 105 provides the terminations for trunks, such as interoffice trunk 132, which terminates at switching office 100 via trunk circuit 131. The trunk link network also provides terminations for miscellaneous other circuits such as digit receiver 107 and announcement system 121. The line and trunk link networks are connected via junctors 106 to permit the interconnection of lines, trunks, and service circuits for call processing under the control of processor 108.

The majority of the logic, control, storage, supervisory and translation functions required for the operation of this system are performed by central processor 108. Processor 108 is a data processing facility and can be functionally divided into a central control 109, a call store 110, and a program store 111 plus maintenance apparatus which has not been shown to simplify the drawing. The call store 110 is a temporary and erasable memory for storing information relating to calls in progress and special services. This information includes the busy/idle status of circuits, digits received and to be transmitted on various calls, the supervisory states of circuits, special screening information, etc., as will be described in more detail below. The program store 111 is a permanent memory and stores translation and routing information in addition to the program instructions which direct the central control to sequentially perform its many functions.

The central control 109 is the information processing unit of the system and executes the program instructions listed in the program store 111 using information temporarily stored in call store 110.

Processor 108 interfaces with lines, trunks, and service circuits via scanners 112–114 and distributor 115. Distributor 115 responds to an order over a bus system from the central control to apply pulses to distribution points connected to the peripheral units of equipment. For example, in response to the appropriate order, distributor 115 signals over conductor 116 to actuate apparatus such as a relay in trunk circuit 131.

Scanners 112–114 are used to gather information for the central control by monitoring leads connected to the various peripheral units. Thus, when a trunk circuit such as 131 changes state as a result of a seizure from the distant originating office, a signal is transmitted via conductor 117 to scanner 113. Similarly, scanner 113 recognizes changes of state in digit receiver 107 via conductor 119 in order to ascertain digits received from lines or trunks. Periodically, the scanners are addressed by central control 109 over a bus system to ascertain any changes of state in the peripheral units.

Switching office 101 basically comprises the same units of equipment as switching office 100 and need not be described herein.

The switching offices 100 and 101 are connected together and to other switching offices via a common channel interoffice signaling system (CCIS) comprising terminals 124 and 127, data units 125 and 126, and a data link 128. The signaling system provides high speed data transmission facilities between the central processors of offices 100 and 101 to carry all signaling, address, and network control information independently of the interoffice talking paths, i.e., trunks used by the customers as well as call information such as calling party identification.

A typical example of a common channel interoffice signaling system which can be used in the present embodiment is disclosed in the *Bell System Technical Journal*, Vol. 57, No. 2, February, 1978.

To illustrate the operation of the novel screening arrangement let it be assumed that the customer at station 102 in FIG. 1 has been provided with this service and can selectively designate the treatment of incoming calls according to their origination. The ensuing description wherein the customer activates his screening service will be made with reference to the block diagram of FIG. 1 and the flow diagram of FIG. 2.

While the screening arrangement can be used to selectively control incoming calls in many different ways, only a few special service treatments are considered herein for illustrative purposes. For example, the customer may wish to block calls or route calls to an answering service except for calls originating from certain preselected stations. On the other hand, the called customer may wish to automatically forward to another station only those calls from designated lines or automatically accept collect calls from preselected stations.

Figure 2:
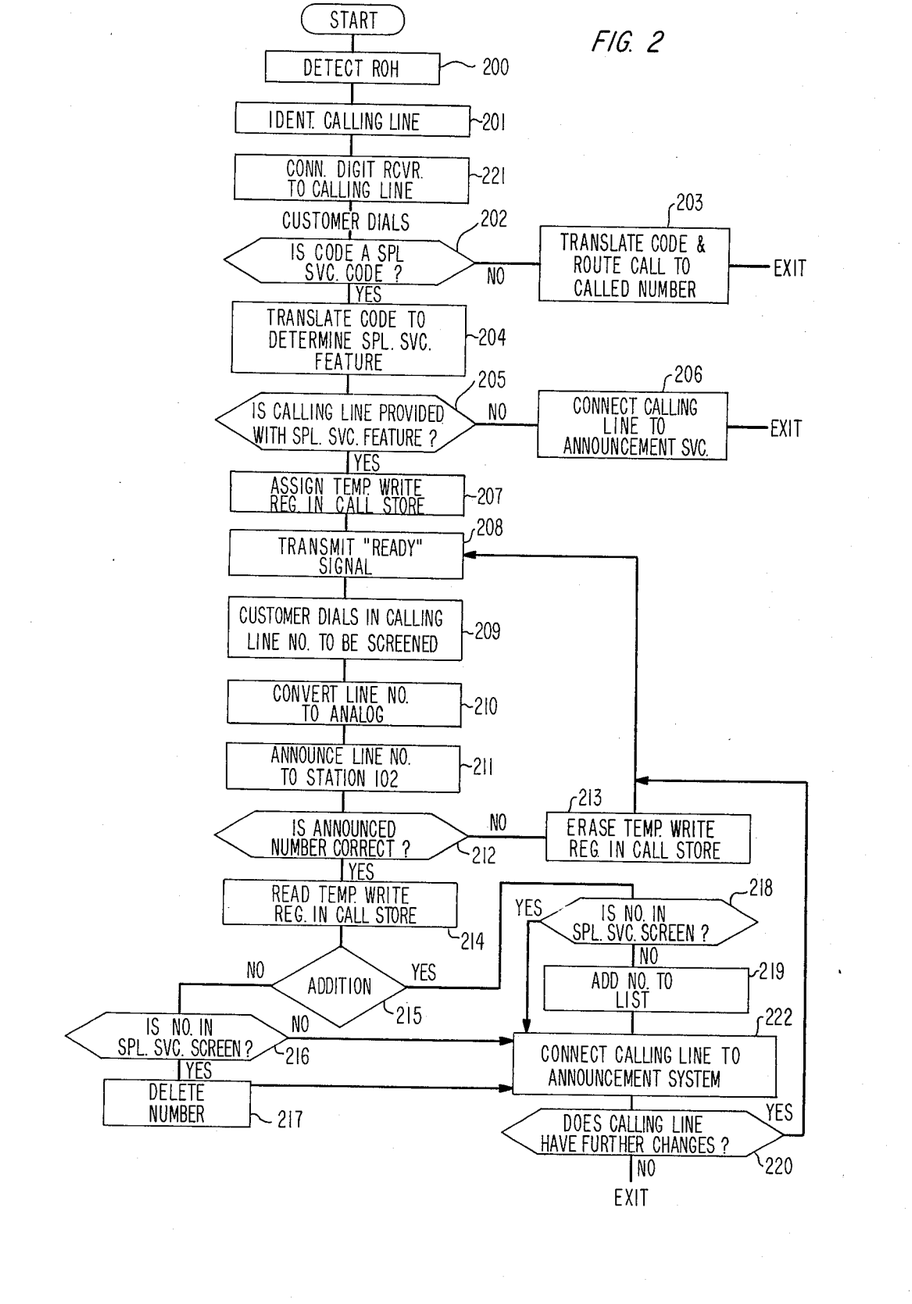
FIGS. 2-8 disclose flow diagrams of the sequence of operations of the switching offices shown in FIG. 1.

To implement one of these features, the customer at station 102 lifts his receiver as though placing a regular telephone call. As shown in the operation blocks 200 and 201 of the flow diagram, scanner 112 recognizes the off-hook and transmits this information to central control 109 which ascertains that this is a new request for service. Central control 109 then connects digit receiver 107 via one of the junctors 106 to station 102. Dial tone is returned to the station and the customer thereat dials or keys a special code indicating that he wishes to make changes in his special call screening table in memory.

This code may be a special 3 or 4 digit number and, in order to distinguish it from other codes, could include the asterisk (*) or number sign (#) found on a telephone key set. Also a special code could be provided for each special service feature to be implemented.

For purposes of illustration let it be assumed that the special code is an asterisk followed by three digits and the calling customer is going to dial *500 which is the special service code assigned to "selective call waiting" service. Through the use of the selective call waiting service, the customer can select those customers whose incoming calls he wishes to be queued and not given a busy tone in the event his line is busy when the incoming call arrives.

Central control 109 reads the digits received by digit receiver 107 via scanner 113 and stores them in a software register associated with receiver 107. Under the control of a digit analysis program, and through the use of translation tables in program store 111, central control 109 ascertains the disposition of the call. As shown in the decision block 202 and operation block 203 of FIG. 2, if the received digits correspond to a called station, central control 109 would proceed to establish a connection to that station via the necessary junctors and trunks. Recognizing that special service code has been dialed, however, central control 109 verifies that the calling customer has been provided with the special screening service feature by examining the calling line class of service as set forth in decision block 205. If the calling line is provided with the special screening service, central control 109 assigns a temporary write register in the call store and transmits a "ready" signal to the customer at station 102 as shown in the operation blocks 207 and 208. This signal might be a second dial tone, stutter dial tone, or a special tone applied via receiver 107. On the other hand, central control 109 might connect announcement system 121 to the line instructing the customer how to proceed in order to make changes in his call screening table. After the announcement, digit receiver 107 would be reconnected to customer station 102 to receive the digits keyed in by the customer.

The announcement system 121 can be one of many known systems. Typical systems useful in the present invention are depicted in U.S. Pat. No. 4,031,324 to R. M. Dudonis of June 21, 1977, and U.S. Pat. No. 4,054,756 to W. K. Comella et al of Oct. 18, 1977. These announcement systems usually comprise a memory for storing digital representations of voice, a programmable controller and apparatus for converting the digital signals to analog voice signals. Typically, the memory stores half-second speech intervals and announcements are generated by combining various half-second intervals. Examples of some stored speech intervals include numbers such as: one, two, three, etc., and short phrases such as: the number, dialed, thank you, please verify, etc.

Longer words and complete messages are generated by combining many half-second phrases which are converted to analog and transmitted over the voice path to a customer station.

The customer provided with the screening service can make additions to a list of calling numbers that are to be given special treatment or the customer can delete certain numbers previously entered on the list. In the example being described, it has been assumed that the customer wishes to add another calling line number to his list of numbers which are already being screened and the particular calling line shall be given special treatment when the called line is busy. In other words, whenever the calling line listed in the screening table places a call to station 102 and station 102 is busy, the calling line will hear ringing and the called station will be signaled indicating that another call is waiting.

Assuming that announcement system 121 is being used in this embodiment of the invention, processor 108 signals the announcement system 121 and the announcement system generates a "ready" message for transmittal to station 102. A suitable message might include "If you wish to update your selective call waiting service, at the sound of the tone please dial the area code and directory number you wish to change plus the letters ADD if you wish to add this number or the letters SUB if you wish to delete this number."

In response to the ready message, the customer at station 102 keys in the directory number of the line he wishes to screen calls from. This number includes the area code, called office code, and a four-digit number of the line plus special digits indicating whether the number is to be added to or deleted from the calls waiting list.

Central control 109 connects digit receiver 107 to station 102 and receiver 107 transmits a tone telling the customer to begin dialing. The central control 109 then receives the number via digit receiver 107 and scanner 113, and the number is stored in a temporary software register in call store 110 while the processor verifies with the customer that the correct number has been received. Processor 108 transmits the received information to announcement system 121 which converts the ten-digit telephone number into an analog voice signal for playing back to station 102. The playing back of the number to be screened is followed by an announcement requesting the customer at station 102 to signify the correctness or incorrectness of the number by dialing one of two preassigned codes.

Announcement system 121 is once again connected to customer station 102 and the following sample announcement is transmitted: "You are adding 609-863-9950 to your selective call waiting service. When you hear the tone, please dial the letter C if this is correct. If this is not correct, please dial the letter I." Assuming for a moment that the customer has keyed in the digit corresponding to an "I" indicating an incorrect number, central control 109 erases the temporary write register and causes a second "ready" announcement to be transmitted to the calling station. The customer at station 102 would then enter the correct number followed by "ADD" or "SUB" and the system would repeat the same verification step described above.

If the customer keys in the digit corresponding to a "C" indicating the correct number has been keyed in, central control 109 reads the number out of the temporary write register according to operation block 214 in FIG. 2 and updates the customer's calling screen table. This is done by writing the area code, office code and directory number of the line being screened and setting the bit indication of the type of screening.

In the example being described, let it be assumed that the customer at station 102, whose telephone number is 201-555-1234, wishes to screen calls from station 103, whose telephone number is 609-863-9950 and wishes to apply "selective call waiting" service. The telephone number for station 103 is entered in the call screening table for station 102 as shown in a sample of the memory table in FIG. 9. The call waiting bit is also set to "1" to activate that service and the bits representing all other services such as call forwarding, priority ringing, etc. are set to "0". With the call waiting bit activated in the call screening table, all calls received from station 103 will hear ringing if the called station 102 is busy and the called station will be signaled that another call is waiting.

Central control 109 now connects announcement system 121 over the networks to station 102. The announcment system transmits a message to the customer that his memory has been updated and informs the customer to signal if he wishes to make further changes in his screening table. If the customer signals within a predetermined interval, a "ready" message is once again sent to station 102 and the customer repeats the procedure described above for adding or deleting numbers from his screening memory. If no signal is received within the designated interval, central control 109 exits this program to process other calls.

As shown in the flow diagram of FIG. 2, central control 109 is directed via four different branches from decision block 215 to operation block 222 wherein the announcement system is connected to the calling station. If the number already appears in the customer's screening memory and he wishes to delete it or if it does not appear and he wishes to add it, the message returned would be, for example, "The change you have requested has been completed, please stand by if you wish to make other changes to your call waiting service."

If the number to be added already appears on the memory list or a number to be deleted does not appear on the list, the message returned to the station would indicate "The change requested to your selective call waiting service can not be completed because the number you have dialed already appears (or 'does not appear') in your screening memory."

To illustrate how the screening service functions for calls incoming to station 102, let it be assumed that a call is originated at station 103 and the customer thereat dials 201-555-1234 which is the telephone number assigned to station 102. The call is processed by switching office 101 in the usual manner and upon translating the area and office codes, the call is routed to destination switching office 100.

This is accomplished by either translating these codes into the appropriate routing information at switching office 101 and selecting an interoffice trunk such as 132 which is in the appropriate route to switching office 100 or sending a CCIS message directly to office 100 without having an actual voice trunk in use. Signaling and called address information is transmitted in binary coded signals via CCIS terminal 124, data unit 125, data link 128, data unit 126, and CCIS terminal 127 to processor 108 in switching office 100.

Figures 3, 4:
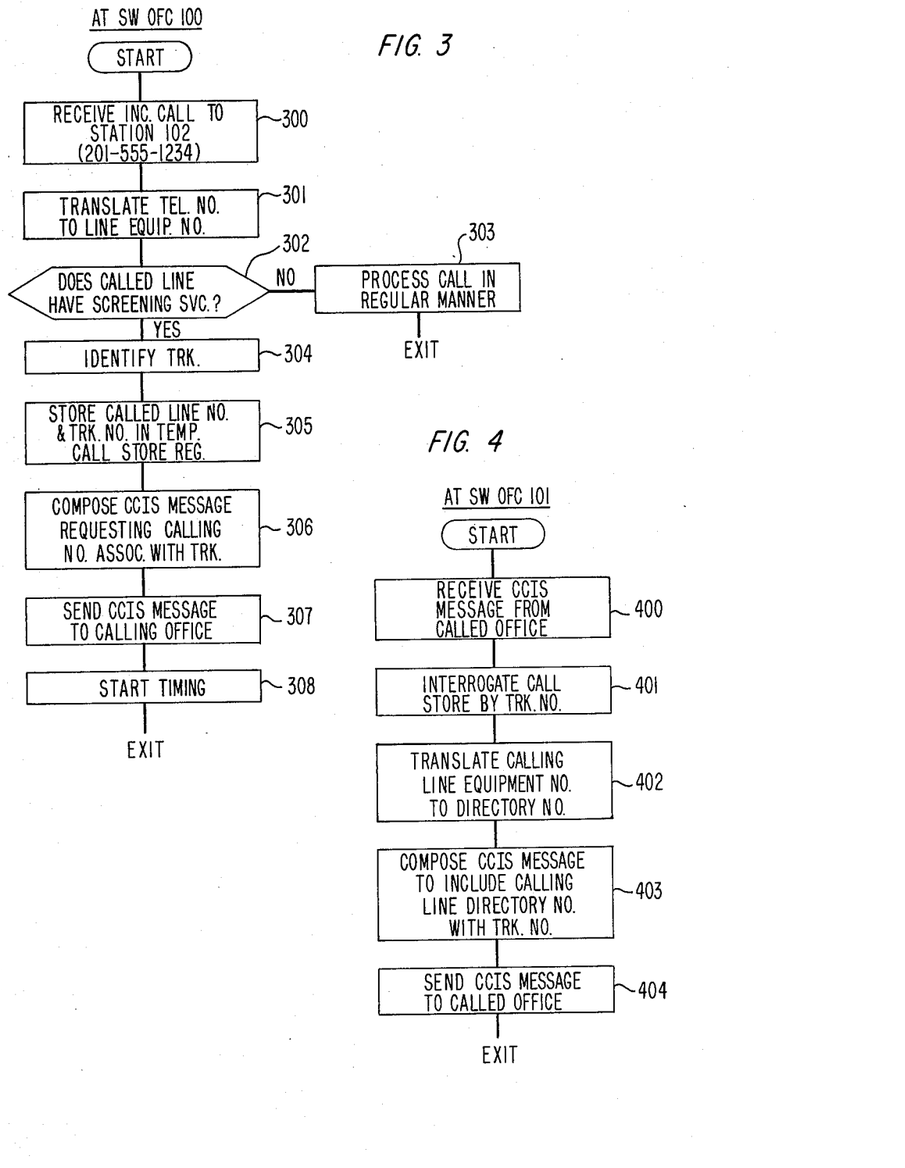

Processor 108 receives the called address and, as shown in the flow diagram of FIG. 3, processor 108 can translate the telephone number into the line equipment location of the called line. From the class of service in the translation tables, the central control can also ascertain whether or not the called station is provided with call screening. If the called customer is not provided with call screening service, the call is processed in the usual manner. If, however, call screening is provided, central control 109 identifies the CCIS terminal 127 and called line number in a temporary call store register as depicted by operation block 305.

Central control 109 also composes a message to be transmitted via the CCIS system to switching office 101 requesting that the identity of the calling line associated with the CCIS message (e.g., line attempting to use interoffice trunk 132) be transmitted to the called office. Central control 109 also starts a software timer waiting for a CCIS message reply from office 101. If the reply message is not received within the allotted time, central control 109 transmits another message via the CCIS system requesting that switching office 101 return a reorder signal to the calling station 103.

At switching office 101, the CCIS message is received from office 100, as indicated in operation block 400 in FIG. 4, and central control 121 looks in its call store to ascertain the line equipment number of the station attempting to set up this call (for example, the station connected to trunk 132). Having found the line equipment number of station 103, central control 121 translates the line equipment number into the directory number 609-863-9950 using a table look-up technique. The directory number along with the trunk number 132 is transmitted via the CCIS system to switching office 100.

Figure 5:
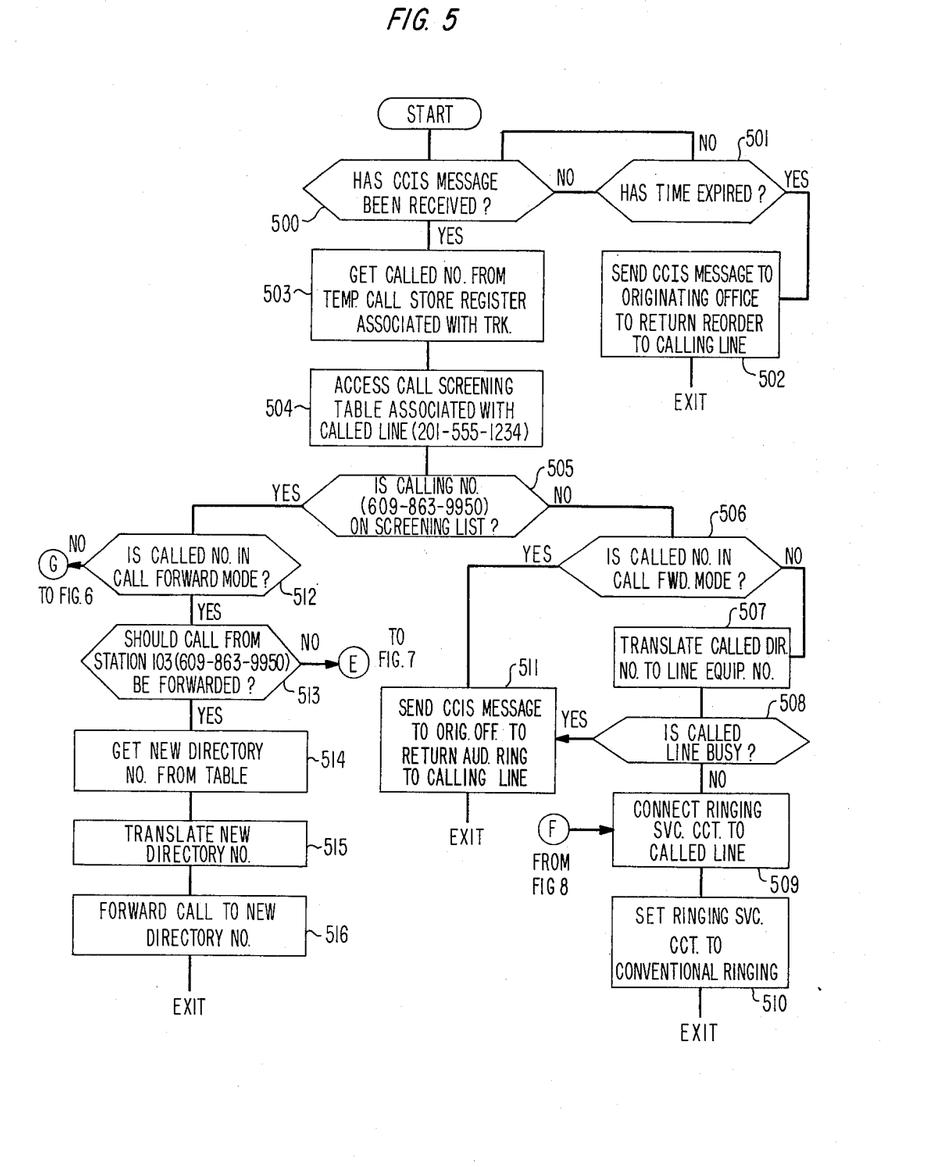
Figure 9:
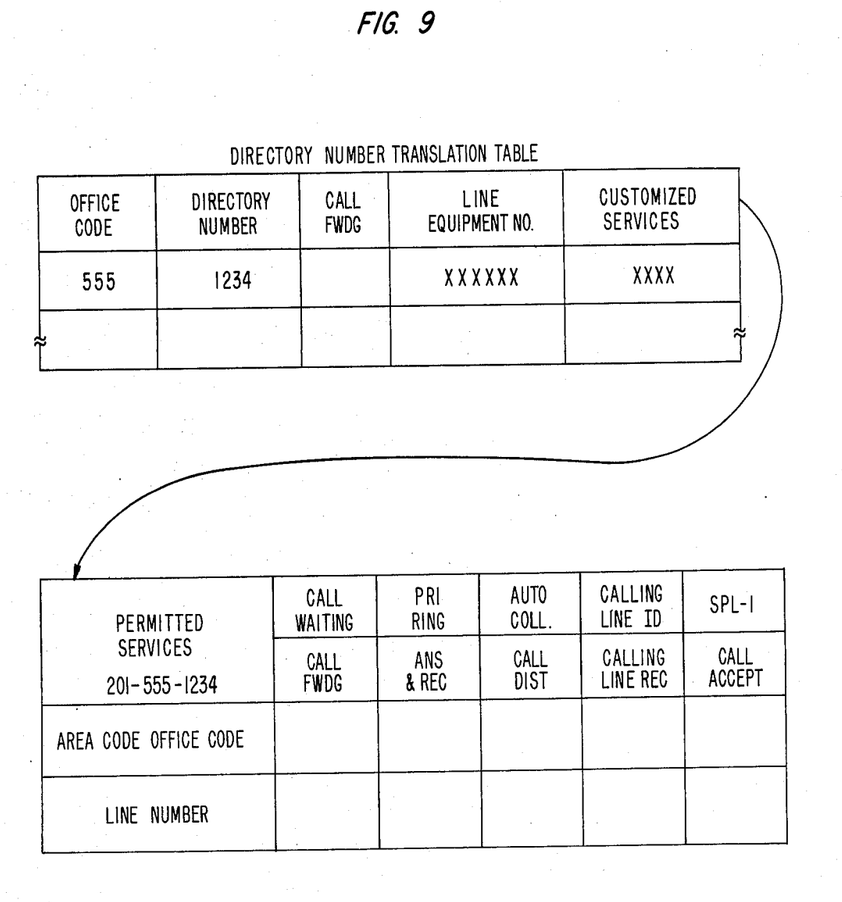
FIG. 9 shows a typical example of certain tables found in the memory of the switching offices.

Turning now to the flow diagram shown in FIG. 5, it can be seen that upon receiving a CCIS message relating to trunk 132, the called number is retrieved at switching office 100. Central control 109 now accesses the memory table containing the screening information for station 102. A typical example of the screening memory table for station 102 is shown in FIG. 9 of the drawing. The memory contains a list of ten-digit calling numbers and in addition to the four-digit directory number each includes an area code and office code.

Associated with each calling number to be screened are the various services to be provided for calls incoming from those numbers. Those services shown in the screening table of FIG. 9 include selective call waiting, selective call forwarding, priority ringing, selective automatic answer and record, automatic collect, selective call distribution, automatic calling line identification, automatic calling line recording, and other special services.

When selective call waiting service is provided, the calls that are directed to station 102 from certain calling lines will be put on hold and hear ringing when station 102 is busy. In addition, the connection to station 102 will be interrupted and station 102 will be alerted that there is another call waiting.

If selective call forwarding service is provided, the customer at station 102 can make entries in a memory to have only certain calls normally routed to his regular directory number rerouted to another number. Call forwarding is generally used when a customer wishes to have his calls forwarded to a temporary number. Selective call distribution is similar, in general, to call forwarding and would provide a service whereby calls from certain customers would be routed to one called station while calls from other calling stations would be routed to another called station to perform the call distribution function.

Priority ringing service is provided to alert the called station by using a distinctive ringing signal thereby informing the called customer that a call is being received from a telephone in the group identified by that ringing signal.

If a called customer has automatic collect service activated in his memory, he will automatically accept charges for all calls incoming from the designated calling customers.

Automatic answer and recording service can also be provided with the screening service being described herein. With automatic answer and recording those calling lines will be routed to an answering service or to a voice storage system where the originating telephone number is recorded and messages can be left for the called customer to retrieve at the called customer's convenience.

Both the calling line identification service and calling number recording service identify the calling telephone number to the called station. When the calling line identification feature is activated, the calling line number is displayed at the called station when the call connection is being set up. With calling line recording service, on the other hand, the calling line number is recorded in a memory which can be accessed by the called station to ascertain what calls were received while the customer was away from his station.

Selective call acceptance is a service which is provided to permit the called station to block all calls from his station except those from lines appearing on the screening table (or the reverse, i.e., to accept all calls except those on the screening table).

The special screening services mentioned above and depicted in FIG. 9 are merely representative of many services which can be offered within the teaching of the invention. For example, FIG. 9 shows a service feature identified as "special" which could function to provide a special announcement to the calling station or special transmission facilities, etc.

Returning now to the description of a typical call. It will be recalled that station 103 originated a call to station 102, the latter station having the call screening service. When the call arrived at office 100, a CCIS message was sent to the originating office 101 requesting the identity of the calling line. The calling line directory number was forwarded over the CCIS system to the called office 100 and the central control thereat accessed the screening table for the called station to ascertain if the calling line is on the list of numbers to be given special treatment.

If the calling line number is not on the screening list as determined by the decision block 505, the call is handled in a conventional manner. More specifically, central control 109 ascertains whether or not the called line has implemented call forwarding. Assuming that the call forwarding service has not been implemented, the directory number is translated into a line equipment number and the line is tested for busy. In the system being described, the busy/idle status of the line is ascertained by examining a bit in memory. If the line is found idle, a ringing service circuit is connected via junctors 106 to the called line and the ringing service circuit is set to ring the customer with a conventional two-second ringing burst followed by a four-second silent interval signal. At this time an audible ringing circuit is connected to trunk circuit 131 to return an audible signal to the customer at station 103 informing the customer that the called station is being rung. This is shown in the branch of the FIG. 5 flow diagram including blocks 506 through 510.

If the called station 102 had implemented selective call forwarding and the calling line number was not found in the screen memory, central control 109 would send a message via the CCIS system to originating switching office 101 to have a ringing signal returned to the calling customer as shown in operation block 511.

It has been assumed, however, that the calling line number 609-863-9950 has been entered in the screen memory for station 102 and that the "selective call waiting" bit has been set so that all calls received from station 101 will be put on call waiting service if station 102 is busy. The sequence of operation for this is set forth in the flow diagram of FIGS. 5-7 beginning with decision block 512 in FIG. 5.

The central control 109 first ascertains whether station 102 has implemented call forwarding and then ascertains whether or not the calling line is permitted access to the "forward to" line number. Central control 109 determines whether the calls from station 103 should be forwarded by examining the screening table shown in FIG. 9.

If calls from the calling line are permitted to be forwarded and station 102 has implemented its selective call forwarding feature, central control 109 determines the "forward to" directory number and translates this number into a routing indication that will be used to route the call as shown in FIG. 5, blocks 512 through 516.

Figure 7:
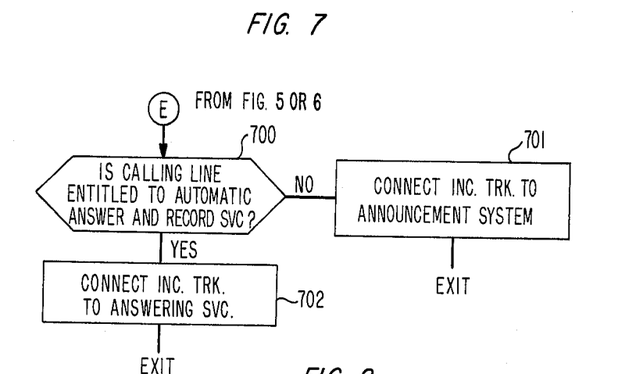

If station 102 is in a selective call forwarding mode, and calls from station 103 are not to be forwarded, central control 109 will now ascertain if the incoming call should be routed to an automatic answering service or to an announcement service as set forth in the branch of the flow diagram of FIG. 7. Automatic answering service can be provided for selected incoming calls to permit certain calling customers to leave messages when station 102 is unattended or does not wish to be disturbed. In the example being described, calling station 103 is not allowed to leave messages for station 102, as indicated by the "0" in the automatic answer and record bit of the screen table, and if station 102 has implemented selective call forwarding, calls from station 103 will be connected to announcement system 120. This is accomplished by central control 109 interconnecting incoming trunk circuit 131 via a junctor 106 to announcement system 121 and setting the announcement system to return a message to the calling customer indicating that the called customer is unavailable and the calling customer should place the call at some other time.

Figure 6:
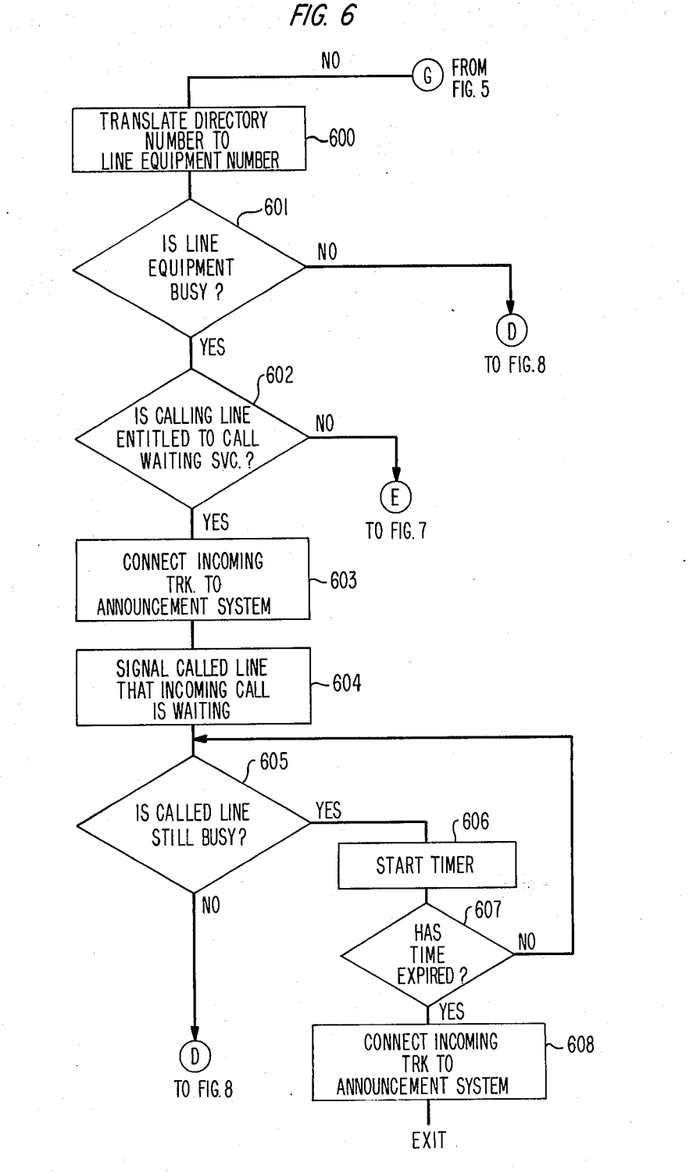

Let it be assumed, however, that the customer at station 102 has not implemented selective call forwarding and the central control will follow the sequence of operation as shown in the flow diagram of FIG. 6 beginning with operation block 600. Central control 109 now ascertains if the called line is busy and if the line is busy, central control 109 then ascertains if the calling line is entitled to selective call waiting service as shown in decision block 602.

Assuming that the called line is busy and that the calling number is one that is permitted the call waiting feature because a call waiting bit corresponding to this calling number has been set in the called station screening table, the incoming trunk circuit 131 is connected to a ringing circuit 121. As shown in operation box 604, the busy connection to called station 102 is interrupted at this time and a tone is sent to the station informing the customer that there is another call and this call is from a line on his selective call waiting list.

Central control 109 begins timing to determine if the called station will pick up the waiting call.

Figure 8:
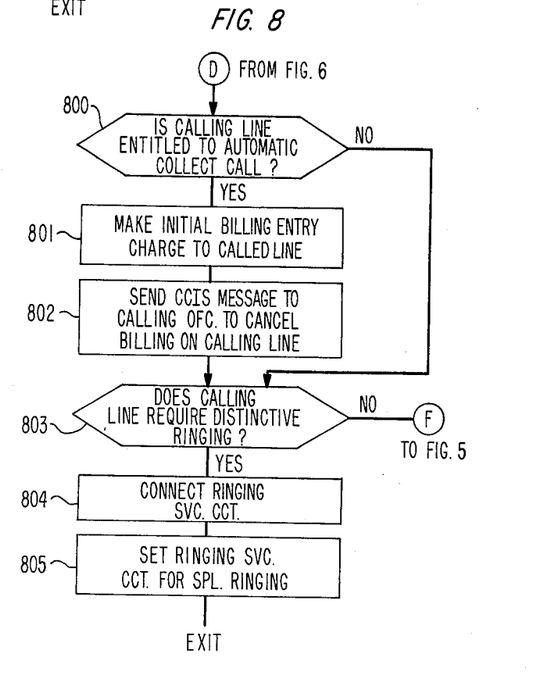

If the customer at station 102 interrupts the call he is on to pick up the waiting call, central control 109 now has to determine the type of ringing signal and the billing arrangement for the call. As shown in FIG. 8, decision block 800, the processor ascertains if the called customer should be charged for the call. This is determined by examining the call screening table shown in FIG. 9. If the automatic collect feature has been provided for this calling number, all calls from the number will be billed to station 102 and not paid for by the calling customer at station 103. Central control 109 assembles the billing information including the called line identity, the calling line number, trunk number, etc., and makes an initial billing entry.

Processor 108 also sends a message over the CCIS system to switching office 101, as shown in operation block 802, and the message informs processor 129 to cancel the billing for this call. Having determined the billing at office 100, central control 109 now determines the ringing to be applied to the called station.

In another service, the system normally applies a conventional ringing signal which comprises two-second ringing bursts separated by four-second silent intervals. However, as noted above, the called customer can designate through the use of his screening memory that his telephone will be rung in a distinctive manner when certain customers are calling. The distinctive ringing signal, in effect, informs the called customer who is calling before the called customer answers the call. Thus, the called customer can readily identify urgent calls by the nature of the ringing signal.

In any event, a ringing service circuit, such as 133 in FIG. 1 is connected over the network to the called station and at the same time an audible ringing signal is returned back over trunk 132 to inform the calling customer that the connection has been established.

Thus, it can be seen from the foregoing description that the called customer can control the disposition of incoming calls from preselected calling lines by entering in his memory the calling line identity along with an indication of the treatment to be given calls from these lines. When a call is received by a line having the disclosed screening service, the terminating office obtains the identity of the calling line and interrogates the memory to determine the disposition of the call according to the information put in memory by the called customer.

Of course, it is to be understood that the arrangement described in the foregoing is merely illustrative of the application and principles of the invention. Numerous and varied other arrangements may be utilized by those skilled in the art without departing from the spirit and scope of the invention.

I claim:

1. A method of controlling the special service treatment of telephone calls destined for called stations from preselected calling stations comprising the steps of     entering into a memory associated with a particular called station the identity of a preselected calling station and an indication designated by the particular called station of the special service treatment to be given to calls subsequently received from said preselected calling station, identifying each station originating a subsequent call to said particular called station, reading the memory according to the identity of the station originating the call to ascertain the special service treatment indication for each call to the particular called station, and disposing of the call according to said special service indication.

2. The invention defined in claim 1 wherein the step of disposing of the call includes the step of forwarding to a station designated by the particular called station only calls from the preselected station.

3. The invention defined in claim 1 wherein the step of disposing of the call includes the step of transmitting a distinctive signal to the particular called station for calls from said preselected station.

4. The invention defined in claim 1 wherein the step of disposing of the call includes the step of ascertaining the busy/idle condition of said particular station and queueing only calls from said preselected station when said particular called station is busy.

5. The invention defined in claim 1 wherein the step of disposing of the call includes the step of automatically charging the particular called station for calls from the preselected calling station.

6. The invention defined in claim 1 wherein the step of disposing of the call includes the step of connecting calls from the preselected calling station to an answering service instead of said particular called station.

7. The invention defined in claim 1 wherein the step of entering in the called station memory comprises the steps of originating a call from said particular called station to a data processor associated with said memory, transmitting to said data processor an access code, the telephone number of the preselected calling station to be given special treatment and an indication of the special treatment to be given calls from said preselected station, and verifying to the particular called station the information transmitted to said processor.

8. The invention defined in claim 7 wherein the step of verifying the information transmitted to said processor includes the steps of ascertaining whether said particular called station is entitled to make entries in the associated memory, and announcing the calling station number to said particular called station.

9. The invention defined in claim 8 wherein the step of identifying each station comprises the step of generating the telephone number of the station in response to a call to said particular called station.

10. The invention defined in claim 9 wherein the step of reading the memory comprises the steps comparing the identity of the station originating each call with a list of calling station identities in the memory, and determining the special service treatment indication of the preselected calling station in the memory list.

11. A method for screening calls destined to a particular station from other stations comprising the steps of writing in a memory associated with the particular station the identity of a preselected one of the other stations designated for screening by the particular station, writing in the memory an indication of the special service treatment to be given calls incoming from the preselected station, ascertaining the identity of a station calling said particular station, comparing the identity of the calling station with the identity of the preselected station in the memory, reading the memory to ascertain the special service indication for the calling station when the calling station identity matches the identity of the preselected station, and disposing of the call according to the indication read from said memory.

12. The invention defined in claim 11 wherein each of the steps of writing comprises the step of transmitting signals from the particular station to the memory, and wherein the step of ascertaining the identity of a calling station is controlled by the class of service of the called station.

13. The invention defined in claim 11 wherein the step of writing in memory the indication of the special service treatment includes the step of setting a memory bit corresponding to each of a plurality of different services to be rendered to the preselected calling line.

14. In a telephone system having stations, a network, and a program controlled processor for controlling the interconnection of said stations over said network, and a memory for storing program instructions for directing said processor, said memory characterized by a list controlled by a particular station of telephone numbers of preselected other stations and an indication associated with each telephone number of the routing of calls from that number to the particular station.

15. The invention defined in claim 14 wherein said indication comprises a plurality of settable memory cells each effective when set for directing said processor to process the call from the calling number associated therewith in a distinctive corresponding manner.

* * * * *